US012773851B2

(12) United States Patent
Kondo et al.

(10) Patent No.: US 12,773,851 B2
(45) Date of Patent: Oct. 27, 2026

(54) CARTRIDGE AND CARTRIDGE REUSE METHOD, THE CARTRIDGE INCLUDING AN ABSORBER RETAINING A LIQUID, A TANK HOLDING THE ABSORBER, AND A LID JOINED TO THE TANK AND OPEN TO ATMOSPHERE

(71) Applicant: CANON KABUSHIKI KAISHA, Tokyo (JP)

(72) Inventors: Soji Kondo, Kanagawa (JP); Wataru Takahashi, Kanagawa (JP); Tatsuo Nanjo, Kanagawa (JP); Takayuki Nakajima, Kanagawa (JP); Keisuke Iinuma, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 210 days.

(21) Appl. No.: 18/628,695

(22) Filed: Apr. 6, 2024

(65) Prior Publication Data

US 2024/0343044 A1 Oct. 17, 2024

(30) Foreign Application Priority Data

Apr. 14, 2023 (JP) ................................ 2023-066414
Mar. 4, 2024 (JP) ................................ 2024-032115

(51) Int. Cl.
*B41J 2/175* (2006.01)
*B09B 3/30* (2022.01)
*B09B 101/02* (2022.01)

(52) U.S. Cl.
CPC ............ *B41J 2/17559* (2013.01); *B09B 3/30* (2022.01); *B09B 2101/02* (2022.01)

(58) Field of Classification Search
CPC ..... B41J 2/17559; B41J 2/17513; B09B 3/30; B09B 2101/02
See application file for complete search history.

(56) References Cited

U.S. PATENT DOCUMENTS 5,619,239 A 4/1997 Kotaki et al. .............. B41J 2/14
6,070,976 A * 6/2000 Takagi .................. B41J 2/1752 347/86

(Continued)

FOREIGN PATENT DOCUMENTS

JP H07-148937 6/1995
JP H10-95128 4/1998

(Continued)

OTHER PUBLICATIONS

U.S. Appl. No. 18/416,599, filed Jan. 18, 2024.

(Continued)

*Primary Examiner* — Ricardo I Magallanes
*Assistant Examiner* — Tracey M McMillion
(74) *Attorney, Agent, or Firm* — Venable LLP

(57) ABSTRACT

A cartridge including an absorber to retain a liquid, a tank having an opening and including an absorber chamber to hold the absorber therewithin, a lid member joined to the tank opening having an air communication port communicating with atmosphere, and a partition member between the lid member and the absorber inside the absorber chamber, the partition member in contact with the absorber. The lid member includes a first protrusion protruding toward the partition member, the first protrusion surrounding the air communication port, the partition member including a groove to be connected to the absorber chamber and a second protrusion to face the first protrusion, and a communication path communicating with the air communication port formed between the first protrusion and the second protrusion, a first buffer chamber formed with a first lid member wall rib and a first partition member wall rib brought into contact with each other.

10 Claims, 16 Drawing Sheets

(56) References Cited

U.S. PATENT DOCUMENTS

| | | | | |
|---|---|---|---|---|
| 6,302,534 | B1 | 10/2001 | Tsukahara et al. | 347/86 |
| 6,739,711 | B2 | 5/2004 | Lee et al. | B41J 2/17 |
| 7,121,656 | B2 * | 10/2006 | Hattori | B41J 2/17513<br>347/86 |
| 8,491,109 | B2 | 7/2013 | Takeda et al. | B41J 2/175 |
| 9,937,725 | B1 | 4/2018 | Komplin | B41J 2/19 |
| 2003/0058315 | A1 | 3/2003 | Lee et al. | B41J 2/175 |
| 2003/0214565 | A1 | 11/2003 | Lee et al. | B41J 2/175 |
| 2004/0165044 | A1 | 8/2004 | Yamada | B41J 2/75 |
| 2008/0049080 | A1 | 2/2008 | Hayashi et al. | B41J 2/175 |
| 2009/0179979 | A1 | 7/2009 | Nanjo et al. | B41J 2/175 |
| 2009/0219337 | A1 * | 9/2009 | Harada | B41J 2/185<br>347/36 |
| 2011/0096128 | A1 | 4/2011 | Ogura et al. | B41J 2/175 |
| 2012/0300003 | A1 | 11/2012 | Takada et al. | B41J 2/175 |
| 2013/0222488 | A1 | 8/2013 | Miyashita et al. | B41J 2/175 |
| 2013/0222491 | A1 | 8/2013 | Nanjo et al. | B41J 2/175 |
| 2015/0375512 | A1 | 12/2015 | Kondo et al. | B41J 2/175 |
| 2015/0375514 | A1 | 12/2015 | Koshikawa et al. | B41J 2/175 |
| 2016/0200113 | A1 | 7/2016 | Nanjo et al. | B41J 2/175 |
| 2016/0200114 | A1 | 7/2016 | Nanjo et al. | B41J 2/175 |
| 2017/0120606 | A1 | 5/2017 | Koshikawa et al. | B41J 2/175 |
| 2017/0120608 | A1 | 5/2017 | Takaoka et al. | B41J 2/175 |
| 2017/0120609 | A1 | 5/2017 | Kimura et al. | B41J 2/175 |
| 2017/0120612 | A1 | 5/2017 | Fukuchi et al. | B41J 2/175 |
| 2017/0120613 | A1 | 5/2017 | Ikebe et al. | B41J 2/175 |
| 2017/0305163 | A1 | 10/2017 | Kimura et al. | B41J 2/175 |
| 2019/0168508 | A1 | 6/2019 | Kondo | B41J 2/14 |
| 2020/0079096 | A1 | 3/2020 | Iinuma et al. | B41J 2/175 |
| 2021/0362506 | A1 | 11/2021 | Kishikawa et al. | B41J 2/175 |
| 2022/0097388 | A1 | 3/2022 | Nanjo et al. | B41J 2/175 |
| 2024/0198689 | A1 | 6/2024 | Murase et al. | B41J 2/175 |
| 2024/0286787 | A1 | 8/2024 | Noda et al. | B65D 1/36 |

FOREIGN PATENT DOCUMENTS

| | | |
|---|---|---|
| JP | 2000-238283 | 9/2000 |
| JP | 2003-118138 | 4/2003 |

OTHER PUBLICATIONS

U.S. Appl. No. 18/737,989, filed Jun. 8, 2024.
U.S. Appl. No. 18/752,383, filed Jun. 24, 2024.
U.S. Appl. No. 18/762,423, filed Jul. 2, 2024.
U.S. Appl. No. 18/771,686, filed Jul. 12, 2024.
U.S. Appl. No. 18/778,955, filed Jul. 20, 2024.
Office Action dated Feb. 18, 2025 in counterpart Japanese Application No. 2024-032115, together with English translation thereof.
Extended European Search Report dated Aug. 21, 2024 in counterpart EP Application No. 24169381.1.

* cited by examiner

CARTRIDGE AND CARTRIDGE REUSE METHOD, THE CARTRIDGE INCLUDING AN ABSORBER RETAINING A LIQUID, A TANK HOLDING THE ABSORBER, AND A LID JOINED TO THE TANK AND OPEN TO ATMOSPHERE

CLAIM TO PRIORITY

This application claims the benefit of Japanese Patent Applications No. 2023-066414 filed Apr. 14, 2023, and No. 2024-032115 filed Mar. 4, 2024, which are hereby incorporated by reference herein in their entirety.

BACKGROUND OF THE INVENTION

Field of the Invention

The present disclosure relates to a cartridge and a cartridge reuse method.

Description of the Related Art

As a cartridge for a printing system, there has been known a type of cartridge in which a print unit to eject a liquid and an absorber chamber to retain the liquid by using an absorber that absorbs the liquid are integrally formed. Japanese Patent Laid-Open No. H10-95128 (hereafter referred to as the '128 document) describes an example of a cartridge configured to supply a print head with a liquid as an ink from an absorber chamber in the cartridge in a case when the liquid is consumed by printing, or the like, and take air into the absorber chamber from an air communication port.

In order to realize a sustainable society, such as a decarbonized society/circular society, the recovery and reuse of used cartridges is required. In order to reduce plastic, there is a need to collect and to reuse used cartridges. If the remaining ink in a cartridge leaks out during the distribution process for collecting used cartridges, there is a high possibility of the print head of malfunctioning due to the ink attached to electric components, or the like, so that the reuse rate may be decreased.

The '128 document discloses a structure in which multiple air chambers are formed by joining a guard member to an inner surface of a lid member, and thereby the ink is prevented from leaking out from the air communication port.

However, in the structure of discussed in the '128 document, a communication groove is provided at a tip or a base end of a partitioning plate of the guard member or the lid member. If the leaked ink is attached to the surface of the lid member or the guard member, the ink may reach the partitioning plate by flowing over the surface due to a posture change, or the like, and resultantly enter the communication groove.

SUMMARY OF THE INVENTION

A cartridge in the present disclosure includes an absorber configured to retain a liquid, a tank including an opening and an absorber chamber configured to hold the absorber, a lid member joined to the opening of the tank and including an air communication port in communication with atmosphere, and a partition member arranged between the lid member and the absorber located inside the absorber chamber, wherein the lid member includes a first protrusion to protrude toward the partition member, and the first protrusion is formed to surround the air communication port, the partition member includes a groove to be connected to the absorber chamber and a second protrusion to face the first protrusion, and a communication path communicating with the air communication port is formed between the first protrusion and the second protrusion.

Further features of the present invention will become apparent from the following description of exemplary embodiments with reference to the attached drawings.

DESCRIPTION OF THE EMBODIMENTS

Hereafter, embodiments of the present disclosure will be described in detail with reference to the drawings.

First Embodiment (Overview of Inkjet Printing Apparatus)

Figure 1:
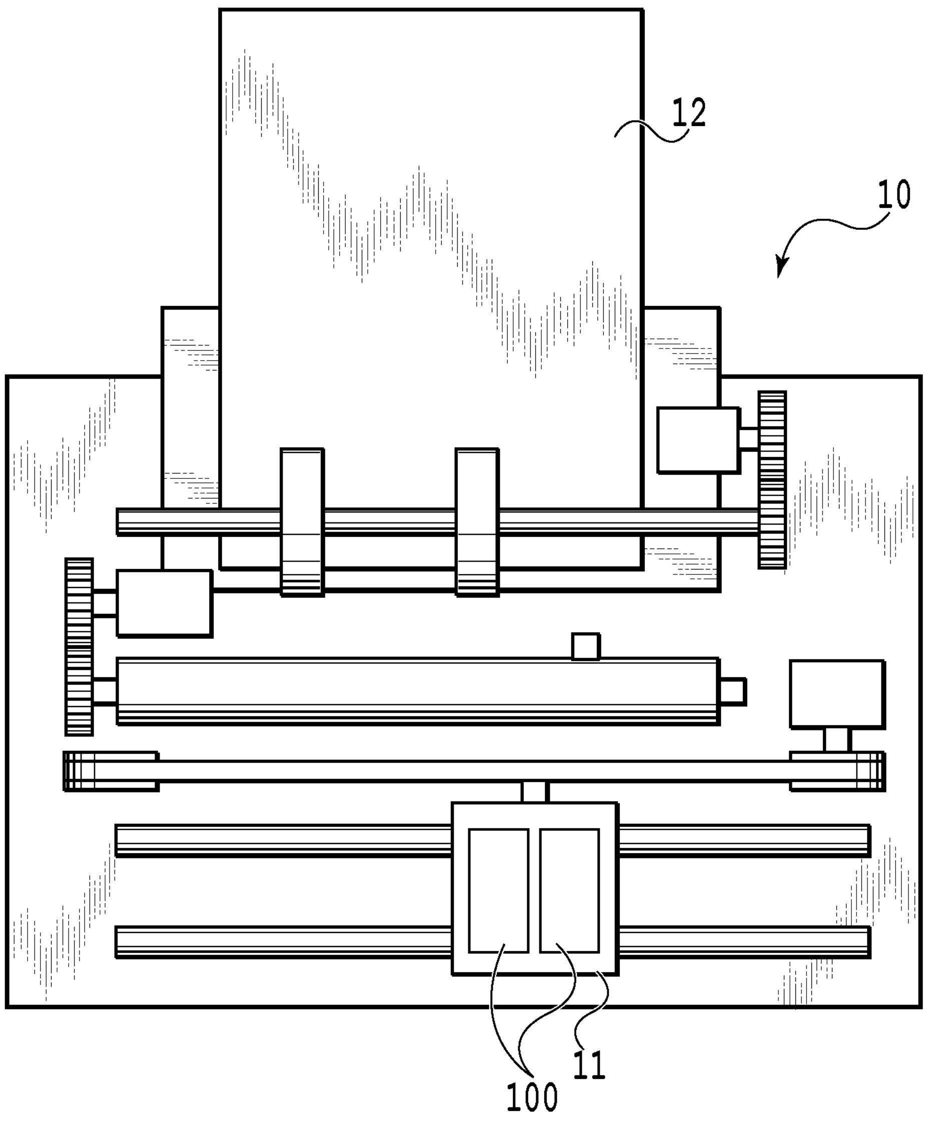
FIG. 1 is a schematic diagram of a printing apparatus in the present disclosure.

FIG. 1 is a schematic diagram of an inkjet printing apparatus according to the first embodiment. An inkjet printing apparatus 10 (hereafter also referred to as the printing apparatus) is an on-carriage type of serial printing system, and includes a cartridge 100 and a carriage 11. The cartridge 100 is mounted on the carriage 11. The printing apparatus 10 forms an image on a print sheet 12 by ejecting the ink from the cartridge 100 to the print sheet 12 while reciprocating the carriage 11 and transporting the print sheet 12 by a predetermined distance in a direction orthogonal to the reciprocal movement of the carriage 11.

(Overview of Cartridge)

Figure 2:
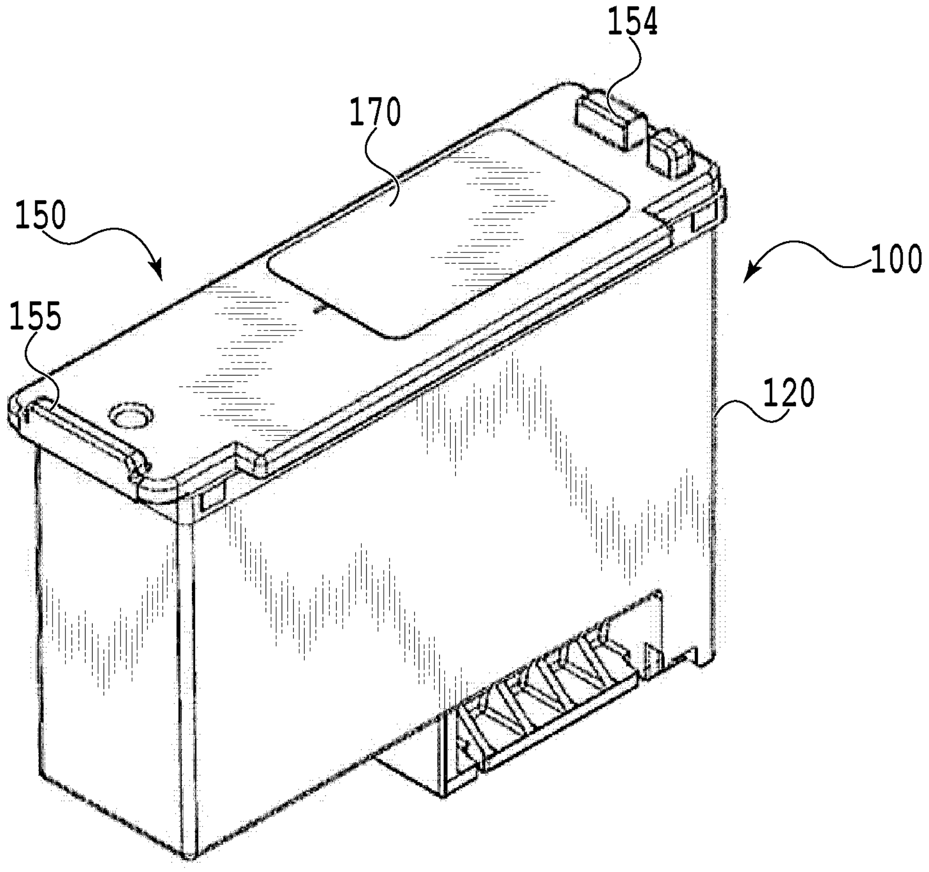
FIG. 2 is a perspective view of an external appearance of a cartridge of a printing apparatus according to a first embodiment.
Figure 3:
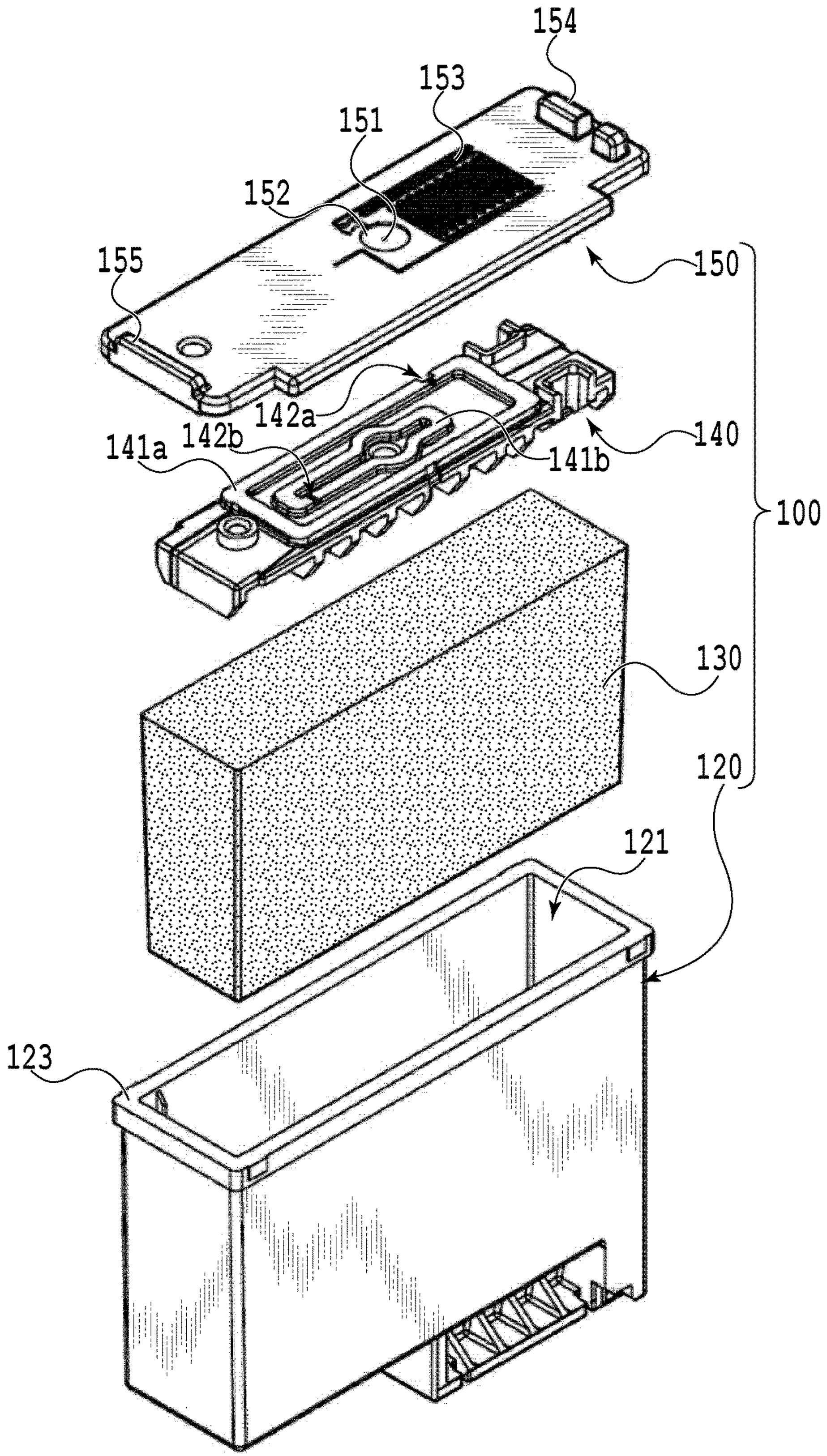
FIG. 3 is an exploded perspective view of the cartridge of the printing apparatus according to the first embodiment.
Figure 4:
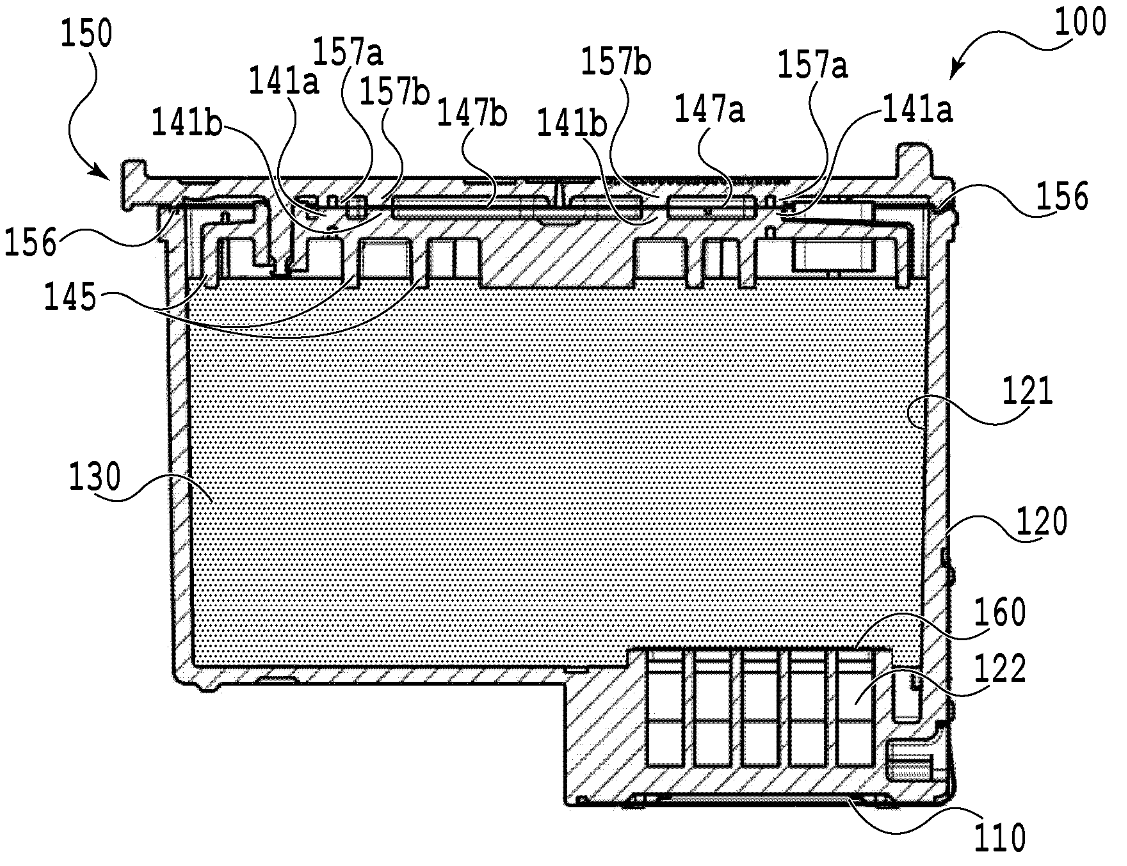
FIG. 4 is a schematic cross-sectional view of the cartridge of the printing apparatus according to the first embodiment.

FIG. 2 is a perspective view of the cartridge of the printing apparatus according to the first embodiment, FIG. 3 is an exploded perspective view of the cartridge of the printing apparatus according to the first embodiment, and FIG. 4 is a cross-sectional view of the cartridge of the printing apparatus according to the first embodiment. The cartridge 100 is a type of cartridge that stores a single color of ink therein, generally referred to as a black ink cartridge. Although the present disclosure is also applicable to a type of cartridge that stores multiple colors of inks therein, generally referred to as a color ink cartridge, the present embodiment will be described by using the black ink cartridge.

The cartridge 100 includes a print head 110 (see FIG. 4) to eject the ink, a tank 120 to store the ink, an absorber 130 to absorb and to retain the ink, and a partition member 140 (see FIG. 3) to press the absorber 130. The cartridge 100 also includes a lid member 150 joined to the tank 120, and a filter 160 (see FIG. 4) to remove foreign substances in the tank 120. The print head 110 is configured to eject the ink based on ejection data, and is arranged on the bottom surface of the tank 120 located on the lower side in the vertical direction. The absorber 130 is composed of a fibrous body or porous body and is capable of retaining the ink therein by exerting capillary forces. The absorber 130 is held in an absorber chamber 121 (see FIG. 3 and others) of the tank 120 so as to be in contact with the filter 160 for removing foreign substances. Then, the ink in the tank 120 and the absorber 130 is in fluid communication with the print head 110 via the filter 160 (see FIG. 4) and an ink flow path 122 (see FIG. 4). This structure is capable of supplying the ink in the absorber 130 to the print head 110 and performing printing. The lid member 150 is arranged so as to close an opening of the tank 120 and defines the absorber chamber 121 in collaboration with the tank 120. The lid member 150 includes an air communication port 151 (see FIG. 3) and is capable of taking the air into the inside of the tank 120 from outside in a case when the ink in the tank 120 is consumed by printing. The partition member 140 is arranged between the absorber 130 and the lid member 150 and holds the absorber 130 while pushing and fixing the absorber 130. The lid member 150 and the partition member 140 will be described in detail later. Although the cartridge in the present embodiment is configured as a unit integrated with the print head, the cartridge is not limited to this and may be configured as a unit separate from the print head.

(Explanation of Lid Member and Partition Member)

Figure 5:
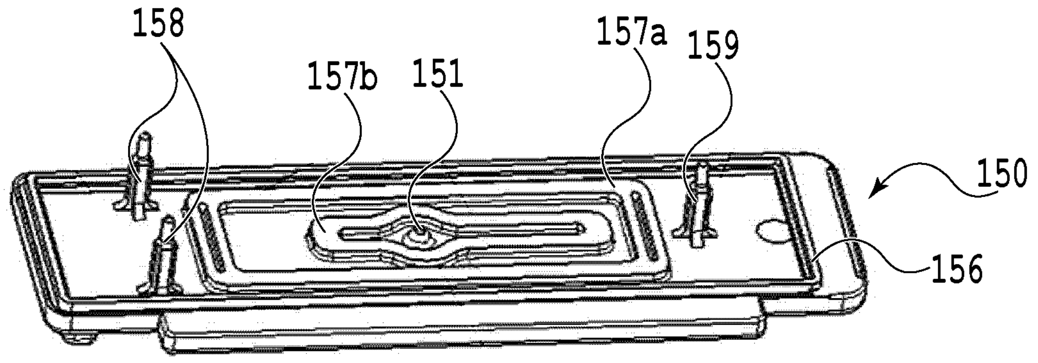
FIG. 5 is a perspective view illustrating a side of a lid member to face a partition member in the cartridge of the printing apparatus according to the first embodiment.
Figure 6A:
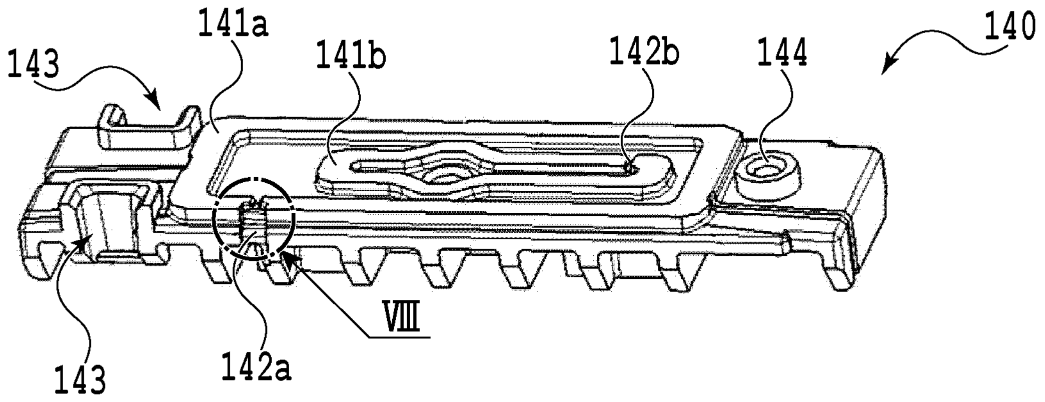
FIGS. 6A to 6C are a perspective view and a bottom view of the partition member of the cartridge of the printing apparatus according to the first embodiment.
Figure 6B:
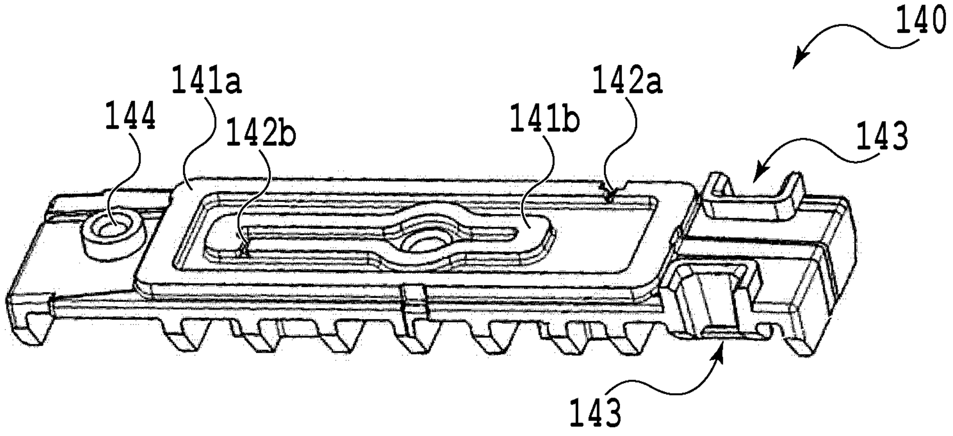
Figure 6C:
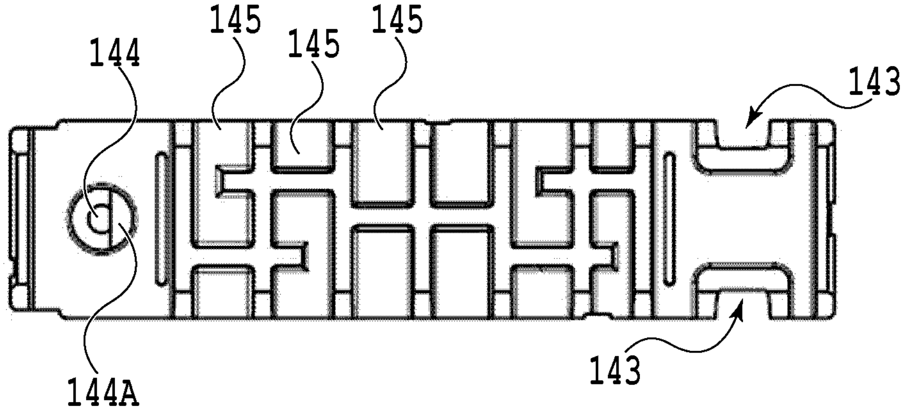
Figure 7:
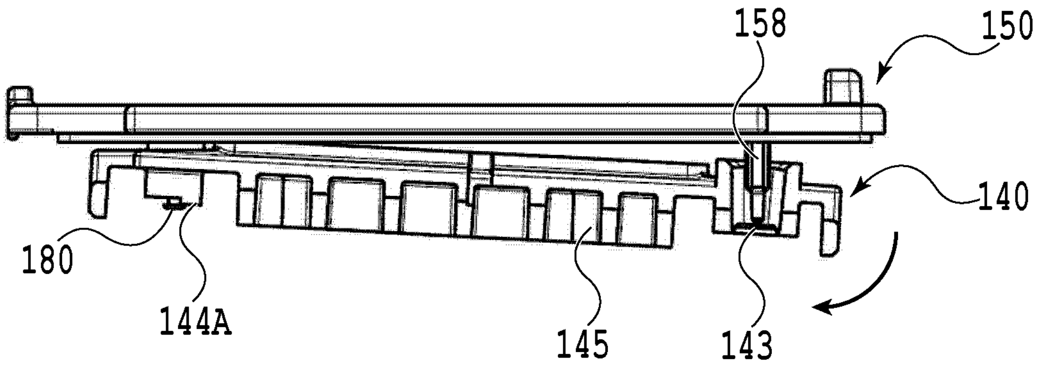
FIG. 7 is a side view of the lid member and the partition member united together in the cartridge of the printing apparatus according to the first embodiment.

Next, the lid member 150 and the partition member 140 of the cartridge of the printing apparatus according to the present embodiment will be described by using FIGS. 2 to 7. FIG. 5 is a perspective view illustrating a side of the lid member 150 to face the partition member 140. FIG. 6A is a perspective view illustrating a side of the partition member 140 to face the lid member 150, FIG. 6B is a perspective view of a side surface opposite to the side surface in FIG. 6A, and FIG. 6C is a plan view of a side of the partition member 140 to face the absorber 130. FIG. 7 is a schematic side view of the lid member 150 and the partition member 140 fixed by crimping and united together.

As shown in FIG. 3, on an outer side, the lid member 150 is provided with the air communication port 151 at a substantially center portion of the lid member 150 and a circular recess 152 formed around the air communication port 151. An air communication groove 153 is formed adjacent to the circular recess 152. An adhesive label 170 (see FIG. 2) is attached to the lid member 150 so as to cover the air communication port 151, the circular recess 152, and the air communication groove 153. This makes it difficult to the ink in the cartridge 100 from leaking or vaporizing during transportation or before use of the cartridge 100. In addition, a protruding main body fixing portion 154 (see FIG. 2 and others) is provided on the outer side of the lid member 150. By fitting a fixing portion (not illustrated) of the carriage 11 to the main body fixing portion 154, the cartridge 100 is fixed to the carriage 11 with high accuracy. In addition, on the outer side of the lid member 150, a protruding grip 155 (see FIG. 2 and others) is provided at a position opposed to the main body fixing portion 154. By pinching the grip 155, a user can firmly hold the grip 155 with his or her fingers and lift the cartridge without slipping.

As illustrated in FIG. 5, a protruding welding rib 156 extending along the outer shape of the lid member 150 is formed on the surface of the lid member 150 to face the partition member 140. The lid member 150 is fixed to the tank 120 by welding by fusing the welding rib 156 of the lid member 150. Specifically, the welding rib 156 of the lid member 150 is brought into pressure contact with a welding surface 123 (see FIG. 3) of the tank 120 and then the lid member 150 is vibrated at high frequency in this state to cause a frictional heat on their contact portions, so that the welding rib 156 and the welding surface 123 are fused with each other. This welding brings the absorber chamber 121 into an air-tight sealed state. Here, the lid member 150 and the tank 120 are made of the same type of plastic material, whose melting temperature is higher than that of a material for the welding rib 156. In the state where the lid member 150 is fixed by welding, the lid member 150 presses the partition member 140 and accordingly the partition member 140 presses the absorber 130. With this pressing, the absorber 130 is held in the absorber chamber 121 in contact with the filter 160. Thus, even if an impact or vibration is applied to the cartridge 100, the absorber 130 is kept unmoved in the absorber chamber 121.

As illustrated in FIG. 5, on the surface of the lid member 150 to face the partition member 140, a first lid member wall rib 157*a* (first protrusion) and a second lid member wall rib 157*b* inside the first lid member wall rib 157*a* are formed so as to largely surround the air communication port 151. As illustrated in FIG. 6A, on the partition member 140, a first partition member wall rib 141*a* (second protrusion) and a second partition member wall rib 141*b* surrounded by the first partition member wall rib 141*a* are formed. In addition, absorber pressing ribs 145 to come into contact with the absorber 130 are formed on a surface of the partition member 140 opposite to the surface on which the first partition member wall rib 141*a* is formed. The first lid member wall rib 157*a* and the first partition member wall rib 141*a* are located relatively at the same positions. The second lid member wall rib 157*b* and the second partition member wall rib 141*b* are located relatively at the same positions. With the lid member 150 fixed to the tank 120 by welding, the first lid member wall rib 157*a* and the first partition member wall rib 141*a* are brought into contact with each other, and the second lid member wall rib 157*b* and the second partition member wall rib 141*b* are brought into contact with each other. As a result, the absorber pressing ribs 145 of the partition member 140 are brought into contact with the absorber 130, and transmit the aforementioned pressing force to the absorber 130.

With the first lid member wall rib 157*a* (see FIG. 5) and the first partition member wall rib 141*a* (see FIG. 6) brought into contact with each other, a first protection wall to prevent an ink leakage is formed. Then, with the second lid member wall rib 157*b* and the second partition member wall rib 141*b* brought into contact with each other, a second protection wall to prevent an ink leakage is formed. In the first partition member wall rib 141*a*, a first communication path 142*a* (a communication path) is formed at a part of the first protection wall. In the second partition member wall rib 141*b*, a second communication path 142*b* (a different communication path) is formed at a part of the second protection wall. Thus, the air communication port 151 communicates with the inside of the absorber chamber 121 via the first communication path 142*a* and the second communication path 142*b* of these double protection walls.

Each absorber pressing rib 145 has a shape to be in contact with a part of the absorber 130 as illustrated in FIG. 4. Thus, in a case when the absorber 130 is pressed, the ink leaking out from the absorber 130 flows also into portions out of contact with the absorber pressing ribs 145, which prevents the ink from leaking.

The partition member 140 has a narrow long shape. Regarding the dimensions of the partition member 140, for example, a width in a short-side direction is 15.2 mm and a length in the longitudinal direction is 64 mm. In this partition member 140, an aspect ratio, which is a width-to-length ratio (a ratio of the width to the length herein), is 1:4. Even though the partition member 140 has the narrow long shape as illustrated in FIG. 6C, the partition member 140 has a strong structure that hardly deforms owing to a lattice-patterned shape of the absorber pressing ribs 145. Since the partition member 140 has the strong shape, it is possible to downsize the overall members of the cartridge 100.

In a case when an impact such as vibration is applied to the cartridge 100 and an environmental change such as a temperature change or atmospheric pressure change occurs, the ink inside the cartridge 100 may leak out from the air communication port 151. In particular, in the case of distribution for collecting the used cartridge 100, the cartridge 100 has a possibility of being subjected to a more excessive impact or environmental change than in the case of normal distribution, and the ink remaining inside is likely to leak out from the air communication port 151. To stop this ink leakage, the first protection wall is provided which is formed with the first lid member wall rib 157*a* (see FIG. 5) and the first partition member wall rib 141*a* (see FIG. 6) brought into contact with each other. In addition, the second protection wall is provided, which is formed with the second lid member wall rib 157*b* and the second partition member wall rib 141*b* brought into contact with each other.

Moreover, in the present embodiment, a pair of alignment pins 158 (see FIG. 5) are formed in the lid member 150 and alignment notches 143 (see FIG. 6) into which the alignment pins 158 are to be inserted are formed in the partition member 140. This makes it easy to bring the first lid member wall rib 157*a* into contact with the first partition member wall rib 141*a*, and also to bring the second lid member wall rib 157*b* into contact with the second partition member wall rib 141*b*.

Moreover, in consideration of handling in production, the lid member 150 and the partition member 140 are preferably formed in a united structure. However, since the lid member 150 and the partition member 140 have to be separated from each other in the case of reusing the cartridge to be described later, these members are preferably united appropriately to such an extent as to be separable from each other. For this reason, in the present embodiment, the lid member 150 includes a crimp pin 159 (see FIG. 5), while the partition member 140 includes a crimp opening 144 and a hook portion 144A (see FIG. 6C). Thus, the crimp pin 159 of the lid member 150 is inserted into the crimp opening 144 of the partition member 140 and thermally crimped to form a crimped portion 180 (see FIG. 7), which can be fitted and fixed to the hook portion 144A. Here, the thermal crimping is performed such that the crimped portion 180 of the crimp pin 159 after the crimping has a diameter slightly larger than that of the crimp opening 144, and therefore the crimped portion 180 can be lightly hooked on the hook portion 144A of the partition member 140. In addition, only one crimp position is provided in one end of the partition member 140 in the longitudinal direction. In a case when the lid member 150 is detached from the tank 120, the one ends of the lid member 150 and the partition member 140 are fixed to each other at the crimp position, while the other ends of the lid member 150 and the partition member 140 are separated from each other. In this state, if the partition member 140 is gripped and rotated in an arrow direction in FIG. 7, a force (moment) is applied to the crimped portion 180 as in a bottle opener, so that the lid member 150 and the partition member 140 can be separated from each other with a very light force. Although the united structure of the lid member 150 and the partition member 140 is described above, this structure is just for the purpose of improving the ease of handling in production. Needless to say, the effects of the present disclosure can be produced even though the lid member 150 and the partition member 140 are formed in a structure other than the united structure.

Figure 8:
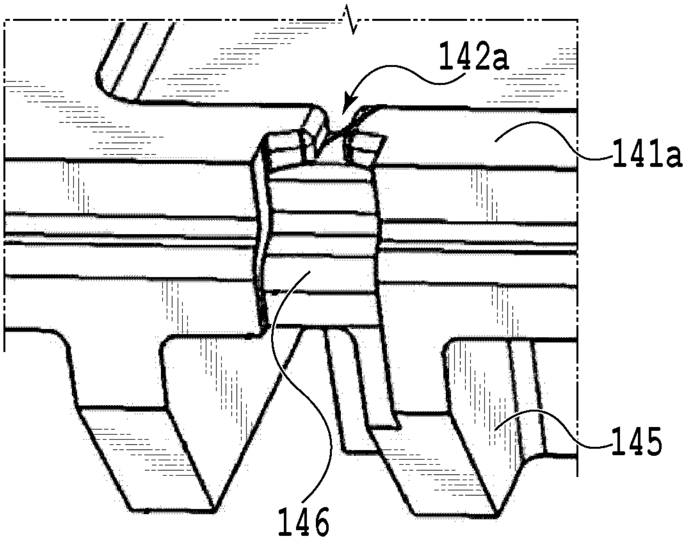
FIG. 8 is an enlarged view of a peripheral area of a first communication path of the partition member illustrated in FIG. 6A.
Figure 9A:
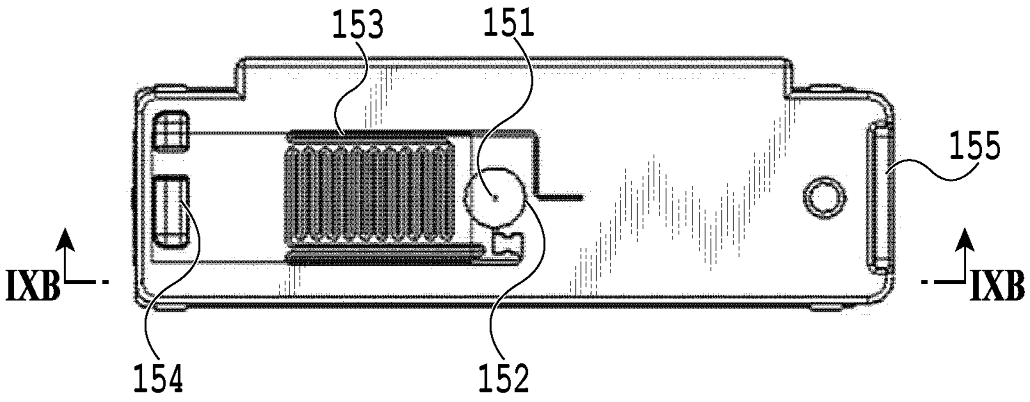
FIGS. 9A and 9B are a top view and a schematic cross-sectional view of the cartridge of the printing apparatus according to the first embodiment.
Figure 9B:
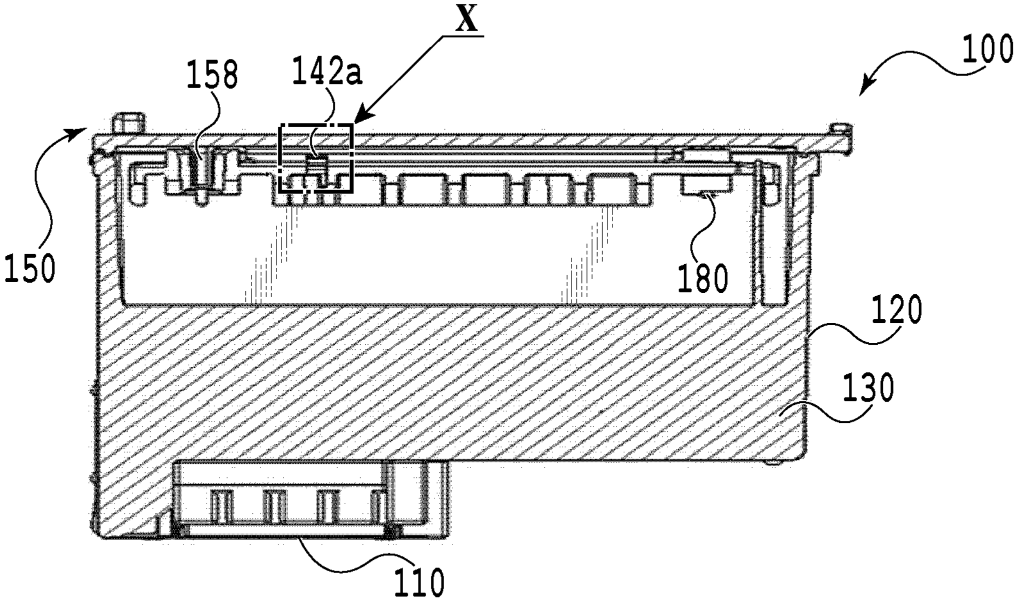
Figure 10:
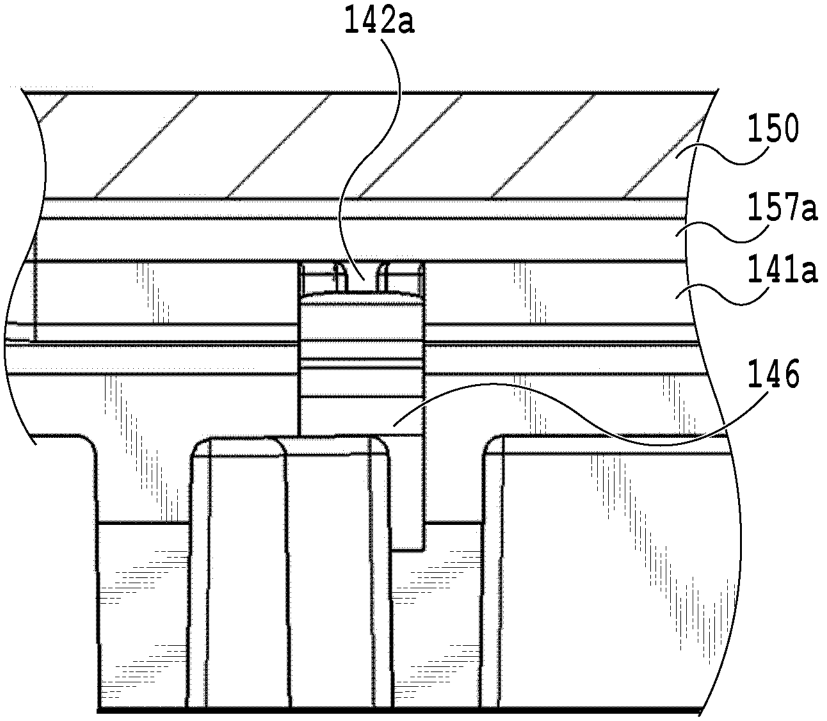
FIG. 10 is an enlarged view of a peripheral area of the first communication path in FIG. 9B.

FIG. 8 is an enlarged view of a peripheral area of the first communication path 142*a* of the partition member 140 as indicated by VIII in FIG. 6A. FIG. 9A is a top view of the cartridge of the printing apparatus according to the first embodiment and FIG. 9B is a schematic cross-sectional view taken along a IXB-IXB line in FIG. 9A. FIG. 10 is an enlarged view of a peripheral area of the first communication path 142*a* as indicated by X in FIG. 9B.

The first communication path 142*a* is provided at an upper tip end of the first partition member wall rib 141*a* and the first communication path 142*a* is formed at a position upwardly apart from a base end of the first partition member wall rib 141*a* in the vertical direction. To the first communication path 142*a*, one end of a discharge groove 146 provided on a side surface of the partition member 140 is connected. The other end of the discharge groove 146 is connected to the absorber pressing rib 145. Thus, the ink attached to the first communication path 142*a* can be returned to the absorber 130 via the discharge groove 146. The absorber 130 in contact with the absorber pressing rib 145 has such a high absorber density as to easily absorb the leaked ink, so that the ink can be returned efficiently.

Here, as illustrated in FIGS. 6A and 6B, the second communication path 142*b* is provided at an upper tip end of the second partition member wall rib 141*b*, and the second communication path 142*b* is formed at a position upwardly apart from a base end of the second partition member wall rib 141*b* in the vertical direction. One end of the second communication path 142*b* is connected to a first buffer chamber 147*a* (see FIG. 4) defined by the first partition member wall rib 141*a* and the second partition member wall rib 141*b*. Meanwhile, the other end of the second communication path 142*b* is connected to a second buffer chamber 147*b* surrounded by the second partition member wall rib 141*b*.

As illustrated in FIG. 4, the first buffer chamber 147*a* is formed with the first lid member wall rib 157*a* and the first partition member wall rib 141*a* brought into contact with each other. Meanwhile, the second buffer chamber 147*b* is formed with the second lid member wall rib 157*b* and the second partition member wall rib 141*b* brought into contact with each other. The air introduced from the air communication port 151 is supplied to the absorber chamber 121 through a route including the second buffer chamber 147*b*, the second communication path 142*b*, the first buffer chamber 147*a*, and the first communication path 142*a* in this order.

The filter 160 (see FIG. 4) can be brought into contact with the absorber 130 because some of the absorber pressing ribs 145 of the partition member 140 are arranged above the filter 160. Thus, the ink in the absorber 130 can be stably supplied to the print head 110 via the filter 160.

In some rare cases, the cartridge 100 is subjected to an impact such as a vibration and the occurrence of an environmental change such as a temperature change or atmospheric pressure change. In such a case, the ink inside the cartridge 100 may leak out from the air communication port 151. In particular, in the case of distribution for collecting the used cartridge 100, the cartridge 100 has a possibility of being subjected to a more excessive impact or environmental change than in the case of normal distribution, and the ink remaining inside is more likely to leak out from the air communication port 151.

According to the structure of the present disclosure, the air communication port 151 is surrounded by the second protection wall (141*b* and 157*b*) and the first communication path 142*a* and the second communication path 142*b* are provided at the upper tip ends of the first partition member wall rib 141*a* and the second partition member wall rib 141*b*. For this reason, even if the ink is leaked out from the absorber 130 (see FIG. 4) and is attached to the lid member 150 or the partition member 140, the ink can be prevented from entering the air communication port 151. The first communication path 142*a* may be formed at a tip end of the first lid member wall rib and the second communication path 142*b* may be formed at a tip end of the second lid member wall rib.

Even if the ink enters the inside of the first protection wall (141*a* and 157*a*), the presence of the first buffer chamber 147*a* makes it possible to reduce an ink leakage from the air communication port 151. Moreover, since the second buffer chamber 147*b* formed by the second protection wall (141*b* and 157*b*) is provided, the ink leakage from the air communication port 151 can be reduced more. In the present embodiment, the first protection wall and the second protection wall are provided. Instead, only one protection wall may be provided or two or more protection walls may be provided. In addition, the number of communication paths may be two or more corresponding to the number of protection walls.

Further, in a case when the ink is attached to the first communication path 142*a*, the ink on the first communication path 142*a* can be returned to the absorber 130 via the discharge groove 146 depending on a posture of the lid member 150 mounted on a printing apparatus main body.

If the ink is attached to a communication path, a meniscus may be generated in the communication path. In the state where the meniscus is generated in the communication path, as the ink is consumed, the outside air is introduced from the air communication port and a pressure drop occurs to increase a back pressure, which may lead to a printing failure. However, by preventing a meniscus from being generated in the first communication path 142*a*, the structure in the present disclosure can prevent a printing failure due to a pressure drop along with the introduction of the air from the air communication port 151. The discharge groove 146 is opened to the protection wall surface. For this reason, even if the ink enters a gap between the lid member and the partition member, the ink can be returned to the absorber 130 through the discharge groove 146.

(Comparative Example of Absorber Cleaning Method)

The present disclosure has an object to make the absorber of a used cartridge clean and free from clogging. Although a comparative example proposes an absorber cleaning method for cleaning an absorber without detaching a lid, the present disclosure does not employ the above method for the following reasons.

As a comparative example of a used absorber cleaning method, there is a method disclosed in Japanese Patent Laid-Open No. 2000-238283, or the like. This cleaning method is to clean a porous body (hereafter referred to as an absorber) by injecting a cleaning liquid through a hollow needle to cause the cleaning liquid to permeate the absorber and then discharging the cleaning liquid from an ink supply port (head). This cleaning method has advantages of being very simple and achieving reuse at low cost. However, with this cleaning method, it is sometimes difficult to thoroughly wash the remaining ink from the absorber. As described above, if the remaining ink in the absorber is solidified, the cleaning liquid has to re-dissolve the solidified ink and then discharge it. In order to re-dissolve the solidified ink, it is necessary to inject the cleaning liquid into the absorber, soak the ink in the cleaning liquid for a long period of time, and thereby gradually dissolve the ink. If the ink is not fully re-dissolved, the absorber cannot be thoroughly cleaned even with multiple times of injections of the cleaning liquid. If cleaning by soaking the ink in the cleaning liquid for a long period of time is selected, the cleaning requires a considerable time, which causes another problem of making mass production impossible. In addition, this cleaning method is considered to have a possibility that the cleaning liquid having permeated the absorber and the remaining ink may fail to be discharged completely and remain in the absorber. The cleaning liquid having permeated the absorber has to be discharged by sucking from the ink supply port. During this suction, however, if an air path is formed, only the air inside the cartridge may be sucked out, and the cleaning liquid and the remaining ink that are desired to be discharged may be left behind. If a new ink is injected to the cartridge having the cleaning liquid and the remaining ink left behind, the color of the ink may change and a desired image may not be formed.

For the above reasons, in order to certainly ensure a clean absorber, it is necessary to detach the lid member and take out and wash the absorber or use a new absorber, so the reuse method in the present disclosure is adopted.

Reuse Method in Present Embodiment

Figure 11:
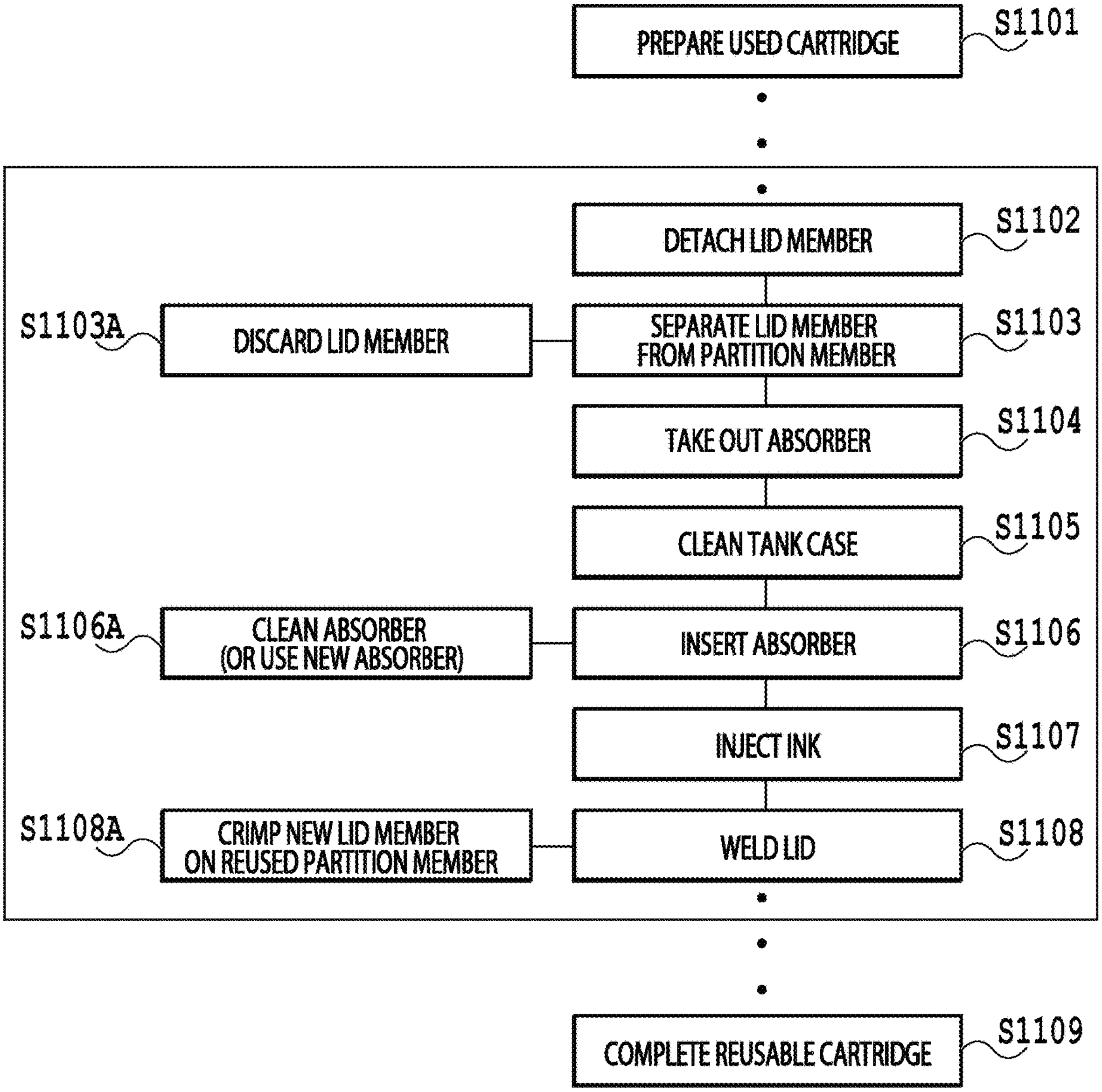
FIG. 11 is a flowchart presenting a reuse method for the cartridge of the printing apparatus according to the first embodiment.

The cartridge reuse method in the present embodiment according to the present disclosure will be described by using FIG. 11. A cartridge reuse process in the present embodiment includes steps starting from a lid member detaching step S1102 of detaching the lid member 150 from the cartridge 100 and ending at a lid member welding step S1108 of welding the lid member 150, each of which will be described in detail. FIG. 11 presents steps from the lid member detaching step to the lid member welding step in a cartridge reuse process flow.

The cartridge reuse process starts from step S1101 of preparing a used cartridge 100. Next, after the external appearance of the cartridge is checked and cleaned, the process proceeds to the lid member detaching step S1102 of detaching the lid member 150. In this step, the lid member 150 is moved relative to the tank 120 and thereby the lid member 150 is detached. Then, the process proceeds to a separating step S1103 of separating the lid member 150 and the partition member 140 from each other. In the separating step S1103, since the lid member 150 and the partition member 140 are united by crimping, the lid member 150 and the partition member 140 are separated. In this fixing by crimping, the lid member 150 and the partition member 140 are fixed to the extent that they can be separated easily as described above. For this reason, the partition member 140 can be relatively moved and separated from the lid member 150. The separated lid member 150 is discarded while the partition member 140 will be reused. Then, the process proceeds to an absorber taking-out step S1104, where the absorber 130 in which the ink is exhausted is taken out from the tank 120. Then, the process proceeds to a tank cleaning step S1105. In the tank cleaning step S1105, the inside of the tank 120 is cleaned. Then, the process proceeds to an absorber inserting step S1106. In the absorber inserting step S1106, the absorber (S1106A) obtained by cleaning the absorber 130 taken out in the absorber taking-out step S1104 may be inserted into the tank 120. Instead, in the absorber inserting step S1106, a new absorber may be inserted into the tank 120. In an absorber cleaning step S1106A, the absorber 130 is cleaned not only by permeating the cleaning liquid and sucking/discharging the cleaning liquid in only one direction, but also by immersing the entire absorber 130 into the cleaning liquid and permeating the cleaning liquid throughout the absorber 130. In the cleaning liquid, the absorber 130 may be cleaned by being pressed and deformed, so that the remaining ink can be removed thoroughly. After the absorber inserting step S1106, the process proceeds to an ink injecting step S1107, where the ink is permeated into the absorber 130 by an injection needle, or the like, and thereby is injected into the tank 120. Then, before the lid member welding step S1108 is performed, a thermal crimping step S1108A is performed to thermally crimp the lid member 150 onto the partition member 140. In the crimping step S1108A, the thermal crimping is performed by using a new lid member as the lid member 150 and the partition member 140 separated in the separating step S1103 as the partition member 140. In the thermal crimping in this step, the lid member 150 is crimped to the extent that the lid member 150 can be easily separated by hands in consideration of future reuse. The lid member 150 and the partition member 140 united together are placed on the absorber and the lid member welding step S1108 is performed. Since the lid member 150 is the new lid member, it is possible to perform the welding that ensures an air-tight seal. Subsequently, the reusable cartridge is completed at step S1109 after printing inspection and packaging.

In the case of the black ink cartridge in the present embodiment described above, the weight of the lid member 150 is about 13% and the weight of the partition member 140 is about 11% in the total weight of the cartridge containing no ink. If the lid member 150 is discarded and the partition member 140 is reused, the reuse rate is about 87%. In the case of a type of lid in the comparative example in which the lid member 150 and the partition member 140 are united into one body, the weight of the lid is about 19% and the reuse rate is 81% if the lid is discarded. Since the lid member 150 is a substantially-flat plate-shaped component, the weight of the component that must be discarded can be reduced to the minimum possible extent and the reuse rate can be improved as compared with the lid in the comparative example.

Second Embodiment

A second embodiment in the present disclosure will be described by using FIGS. 12 to 14. The basic structure in the present disclosure and the same functions and structures as in the first embodiment will be omitted from the description and only different points will be described.

Figure 12:
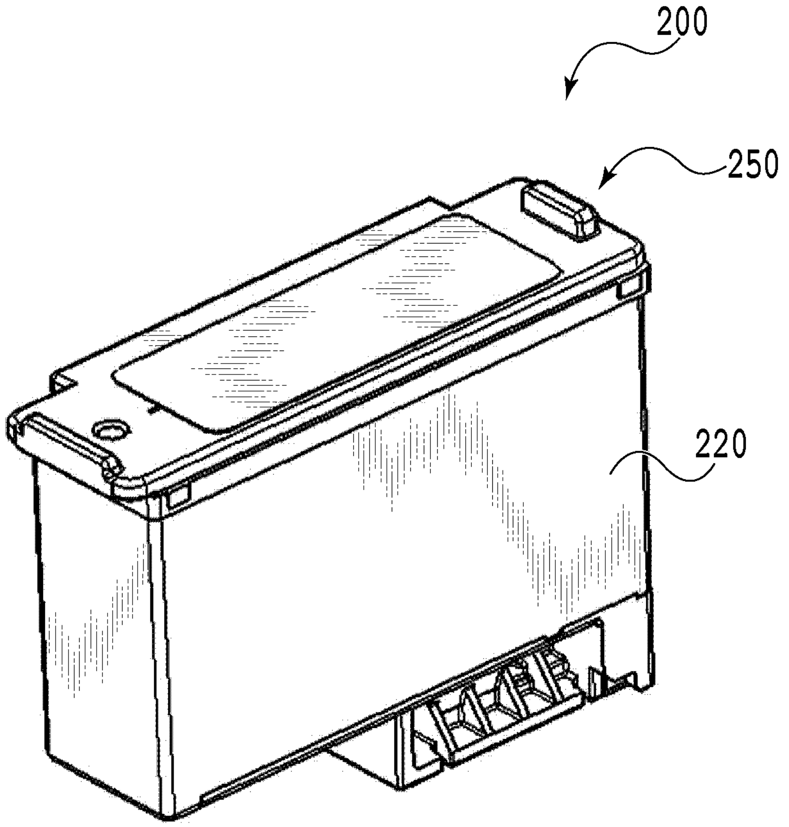
FIG. 12 is a perspective view of an external appearance of a printing apparatus according to a second embodiment.
Figure 13:
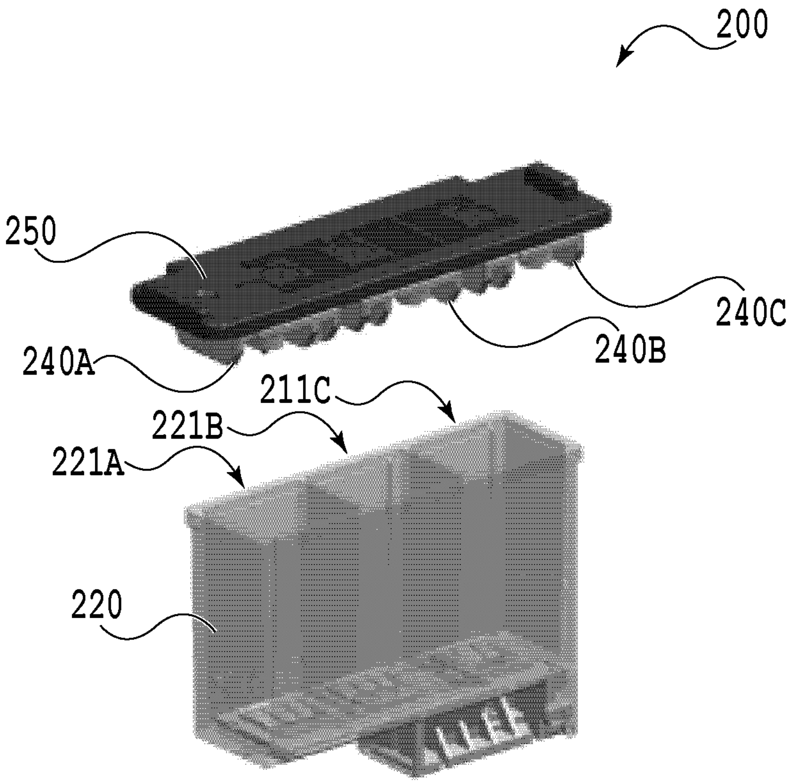
FIG. 13 is an exploded perspective view of the cartridge of the printing apparatus according to the second embodiment.

FIG. 12 is a perspective view of an external appearance of a cartridge of a printing apparatus according to the second embodiment. FIG. 13 is an exploded perspective view of the cartridge of the printing apparatus according to the second embodiment. FIG. 14 is a schematic cross-sectional view of the cartridge of the printing apparatus according to the second embodiment. The cartridge in the second embodiment is a type of cartridge that stores three colors of inks, generally referred to as a color ink (cyan, magenta, and yellow) cartridge 200.

The cartridge 200 includes a print head 110 to eject the inks, a tank 220 to store the inks, absorbers 230A, 230B, and 230C to absorb and hold the respective inks, and partition members 240A, 240B, and 240C to press the respective absorbers 230. Here, the three absorbers 230A, 230B, and 230C may be collectively referred to as the absorber 230. Also, the partition members 240A, 240B, and 240C may be collectively referred to as the partition member 240. The cartridge 200 includes a lid member 250 joined to the tank 220, and a filter 260 to remove foreign substances in the tank 220. The absorbers 230A, 230B, and 230C are held in their respective absorber chambers 221A, 221B, and 221C of the tank 220 so as to be in contact with the filter 160 for removing foreign substances. The inks in the tank 220 and the absorbers 230A, 230B, and 230C are in fluid communication with the print head 110 via the filter 160 and ink flow paths 122. This structure makes it possible to supply the inks in the absorbers 230A, 230B, and 230C to the print head 110. The lid member 250 is arranged so as to close an opening of the tank 220 and defines the absorber chambers 221A, 221B, and 221C in collaboration with the tank 220. The lid member 250 includes air communication ports 251A, 251B, and 251C (hereafter, may also be collectively referred to as the air communication port 251) in air communication with their respective absorber chambers and is capable of taking the air into the inside of the tank 220 from outside in a case when the inks in the tank 220 are consumed by printing. The partition members 240A, 240B, and 240C are arranged between the respective absorbers 230A, 230B, and 230C and the lid member 250, and hold the absorbers 230A, 230B, and 230C while fixing them. Also, in the present embodiment, the same effects can be produced by using a structure similar to that of the first embodiment. In particular, in the case of reuse of the lid member 250, it is necessary to seal all the three absorber chambers, so that the welding yield is presumably decreased as compared with the case of a one-color cartridge. From this viewpoint, the present embodiment may be a reuse method more effective than in the first embodiment. The partition members in the present embodiment include three partition members for the respective inks, but are not limited to this case. The partition member may consist of a single partition member or two or more partition members except for three partition members. Also, the tank in the present embodiment is structured such that the three absorber chambers are formed and the three absorbers are held in the respective three absorber chambers, but is not limited to this, and may be structured such that two or more absorber chambers are formed and two or more absorbers are held in the respective absorber chambers.

(Explanation of Lid Member and Partition Member)

Next, the lid member and the partition members of the cartridge of the printing apparatus in the present embodiment will be described.

Figure 15A:
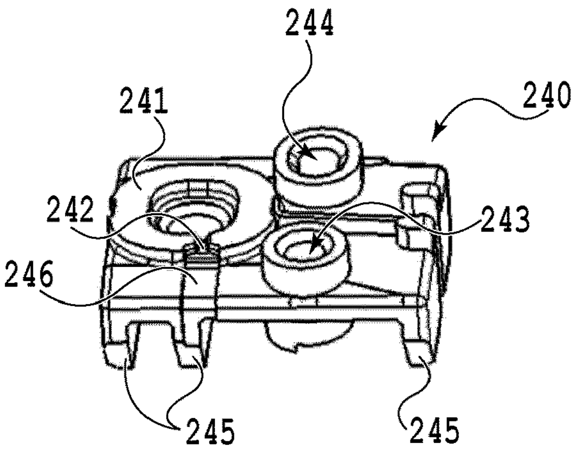
FIGS. 15A to 15D are perspective views and a bottom view illustrating a partition member of the cartridge of the printing apparatus according to the second embodiment.
Figure 15B:
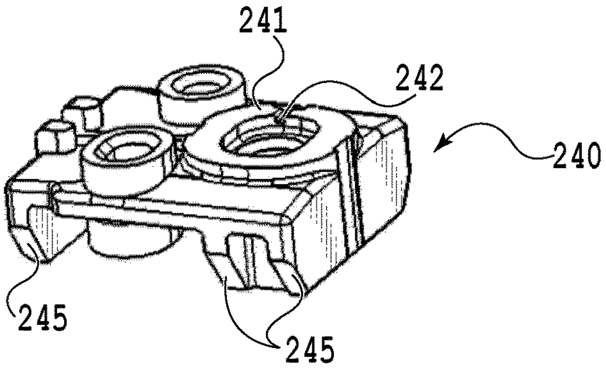
Figure 15C:
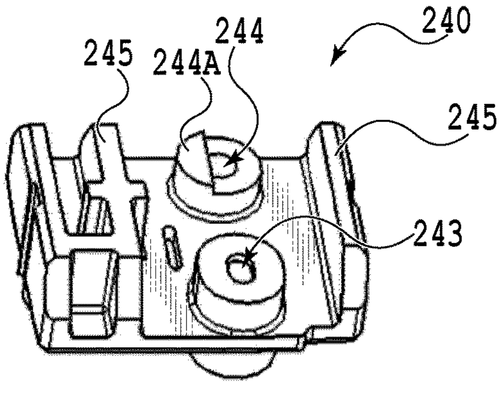
Figure 15D:
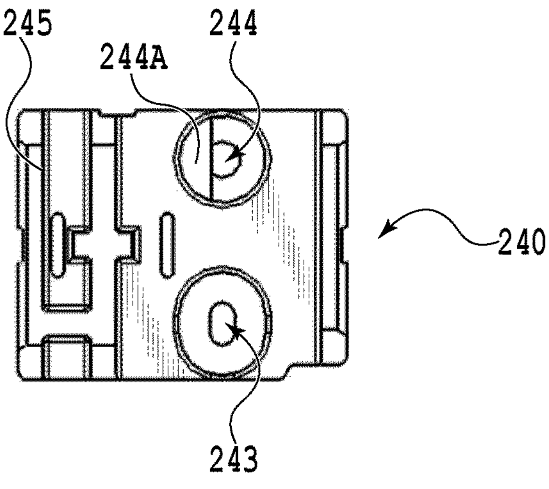

FIG. 15A is a perspective view illustrating the partition member 240 of the cartridge of the printing apparatus according to the second embodiment and FIG. 15B is a perspective view seen from a side opposite to the side in FIG. 15A. FIG. 15C is a perspective view seen from the bottom in FIG. 15A and FIG. 15D is a bottom view illustrating the partition member 240 of the cartridge of the printing apparatus according to the second embodiment.

Figure 14:
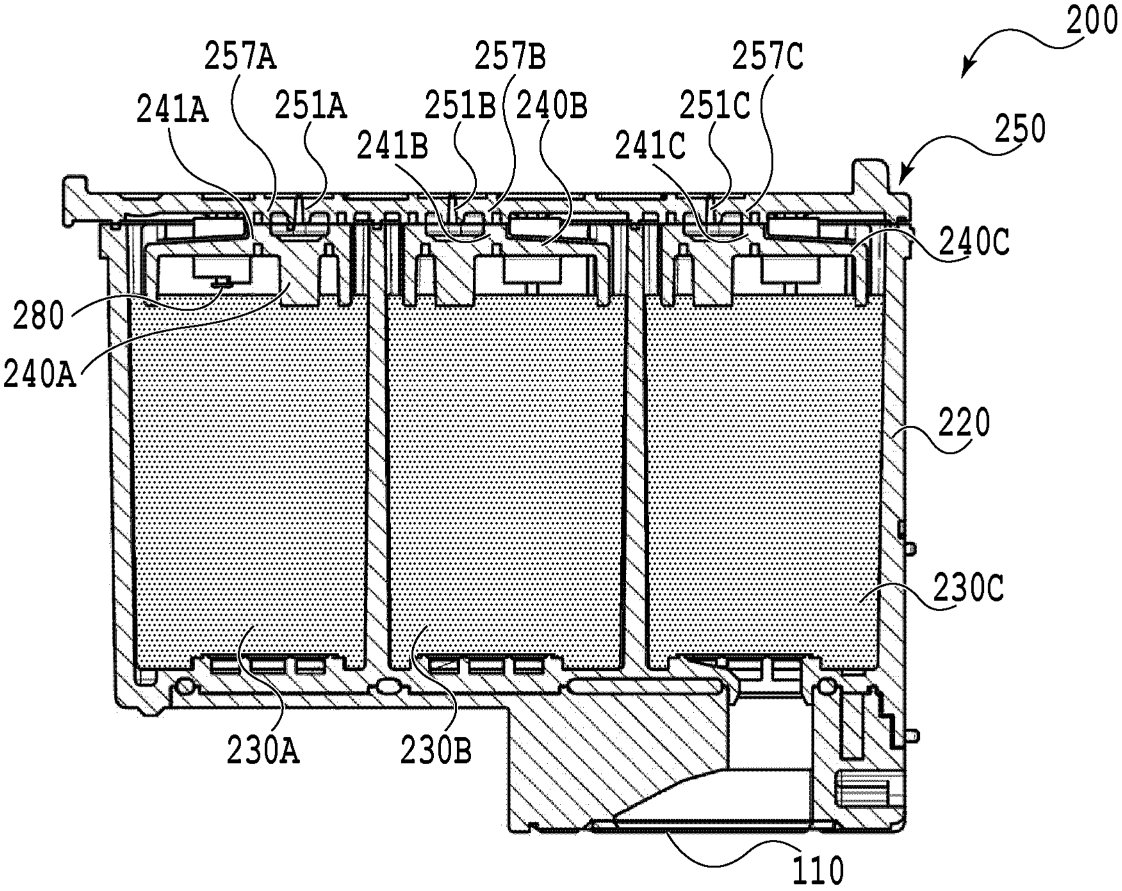
FIG. 14 is a schematic cross-sectional view of the cartridge of the printing apparatus according to the second embodiment.

As shown in FIG. 14, on a surface of the lid member 250 to face the partition members 240, a lid member wall rib 257 is formed so as to surround each air communication port 251. As shown in FIG. 15, a partition member wall rib 241 is formed on the partition member 240. Then, on a surface of the partition member 240 to face the absorber 230, absorber pressing ribs 245 are formed. The lid member wall rib 257 and the partition member wall rib 241 are located relatively at the same positions. With the lid member 250 fixed by welding, the lid member wall rib 257 and the partition member wall rib 241 are brought into contact with each other, so that the absorber pressing ribs 245 of the partition member 240 are brought into contact with the absorber 230, and transmit the aforementioned pressing force to the absorber 230.

With the lid member wall rib 257 (see FIG. 14) and the partition member wall rib 241 brought into contact with each other, a protection wall to prevent an ink leakage is formed. A communication path 242 (see FIG. 15A and others) is provided at an upper tip end of the partition member wall rib 241 and the communication path 242 is formed at a position upwardly apart from a base end of the partition member wall rib 241 in the vertical direction. To the communication path 242, one end of a discharge groove 246 provided on a side surface of the partition member 240 is connected. The other end of the discharge groove 246 is connected to the absorber pressing rib 245. Thus, the ink attached to the communication path 242 can be returned to the absorber 230 via the discharge groove 146.

In the present embodiment, an alignment pin (not illustrated) and a crimp pin (not illustrated) are formed in the lid member 250. In the partition member 240, an alignment opening 243 into which the alignment pin is to be inserted, a crimp opening 244 into which the crimp pin is insertable, and a hook portion 244A are formed. In this structure, the alignment pin is inserted into the alignment opening 243 and the crimp pin is inserted to the crimp opening 244. Then, the tip end of the crimp pin is thermally crimped to form a crimped portion 280 (see FIG. 14). As a result, the crimped portion 280 is hooked and thereby fixed to the hook portion 244A of the partition member.

From the viewpoint of ease of reuse, a hooking shape for fixing the lid member 250 and the partition member 240, such as the crimped portion 280, is preferably as easy to break as possible. In the present embodiment, as illustrated in FIG. 15D, the hook portion 244A has a semi-circular shape and only a part of the crimped portion 280 is hooked. Thus, in the operation of separating the lid member 250 and the partition member 240 for reuse, the separation is easy because only the part of the crimped portion 280 has to be broken.

Other Embodiments

Figure 16:
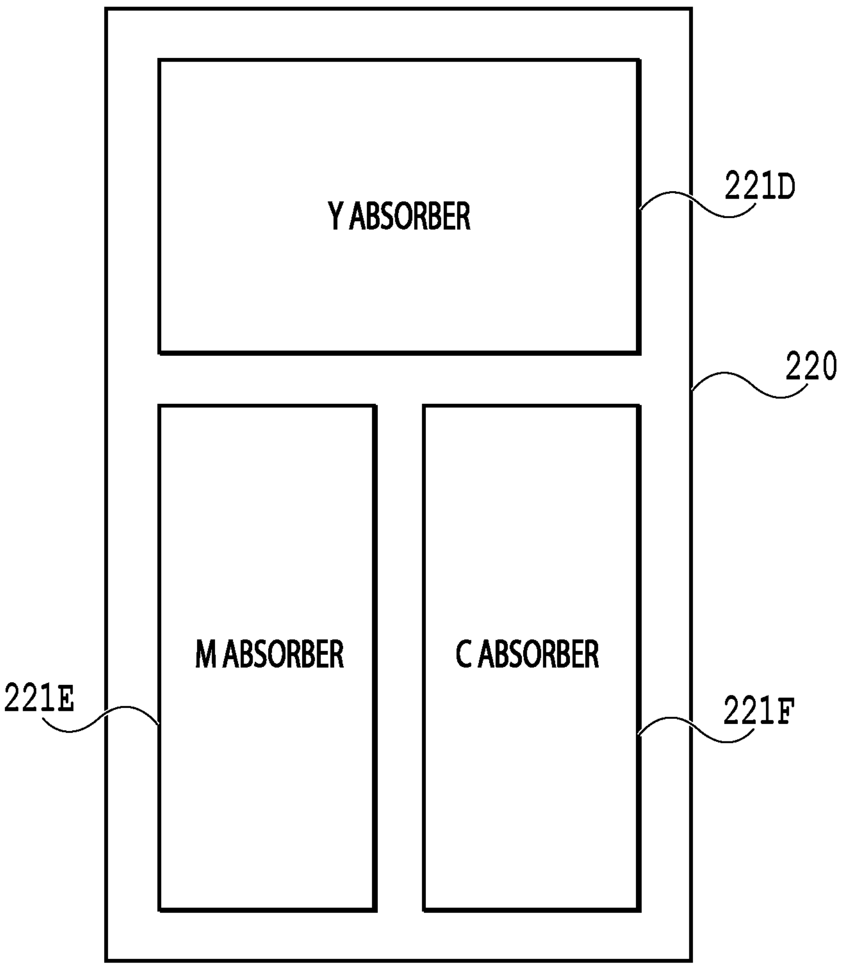
FIG. 16 is a schematic cross-sectional view of a tank of a cartridge of a printing apparatus according to the present disclosure.

The structures of the lid member and the partition member in the embodiments of the present disclosure may be adapted to a tank in any shape. As an example, in the present disclosure, the tank 220 can be adapted to support a cartridge including multiple absorber chambers as illustrated in FIG. 12. In addition, FIG. 16 is a schematic cross-sectional view of a tank taken along a direction orthogonal to the vertical direction. The present disclosure is also applicable to a structure where a tank is divided into three by a T-shaped wall and the absorbers are arranged in parts of absorber chambers 221D, 221E, and 221F.

The technologies described in this specification have the potential to contribute to the achievement of a sustainable society, such as a decarbonized society/circular society.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cartridge comprising:

an absorber configured to retain a liquid;

a tank having an opening and including an absorber chamber configured to hold the absorber within the absorber chamber;

a lid member joined to the opening of the tank and including an air communication port in communication with atmosphere;

a partition member arranged between the lid member and the absorber located inside the absorber chamber, the partition member being in contact with the absorber, wherein the lid member includes a first protrusion to protrude toward the partition member, and the first protrusion is formed to surround the air communication port, the partition member including a groove to be connected to the absorber chamber and a second protrusion to face the first protrusion, and a communication path communicating with the air communication port formed between the first protrusion and the second protrusion;

a first buffer chamber formed with a first lid member wall rib and a first partition member wall rib brought into contact with each other; and a second buffer chamber formed with a second lid member wall rib and a second partition member wall rib brought into contact with each other, wherein an absorber pressing rib to be in contact with the absorber is formed in the partition member, and one end of the groove is connected to the second protrusion and the other end of the groove is connected to the absorber pressing rib.

2. The cartridge according to claim 1, wherein the communication path is formed at a tip end of the second protrusion in the partition member.

3. The cartridge according to claim 1, wherein the communication path is formed at a tip end of the first protrusion of the lid member.

4. The cartridge according to claim 1, wherein the lid member includes a third protrusion inside the first protrusion.

5. The cartridge according to claim 4, wherein the partition member includes a fourth protrusion to face the third protrusion, and a different communication path other than the communication path is formed between the third protrusion and the fourth protrusion.

6. The cartridge according to claim 1, wherein the air communication port communicates with a print head configured to eject the liquid.

7. The cartridge according to claim 1, wherein the tank includes one absorber chamber, and one absorber is held in the absorber chamber.

8. The cartridge according to claim 1, wherein the tank includes a plurality of absorber chambers, and a plurality of the absorbers are held in the plurality of absorber chambers, respectively.

9. A cartridge reuse method for allowing reuse of a cartridge after the cartridge consumes a liquid, the cartridge including:

an absorber configured to retain the liquid;

a tank having an opening and including an absorber chamber configured to hold the absorber within the absorber chamber;

a lid member joined to the opening of the tank and including an air communication port in communication with atmosphere; and a partition member arranged between the lid member and the absorber located inside the absorber chamber, the partition member being in contact with the absorber, wherein the lid member includes a first protrusion to protrude toward the partition member, the first protrusion being formed to surround the air communication port, the partition member including a groove to be connected to the absorber chamber and a second protrusion to face the first protrusion, and a communication path in communication with the air communication port formed between the first protrusion and the second protrusion, wherein an absorber pressing rib to be in contact with the absorber is formed in the partition member, and one end of the groove is connected to the second protrusion and the other end of the groove is connected to the absorber pressing rib, the method comprising the steps of:

providing the cartridge, having consumed the liquid;

detaching the lid member from the tank;

separating the lid member from the partition member;

exchanging the absorber;

cleaning an inside of the tank;

inserting an absorber renewed in the absorber exchanging step into the tank and injecting the liquid into the tank;

fitting a lid member different from the lid member to the partition member; and securing the different lid member to the tank.

10. A cartridge comprising:

an absorber configured to retain a liquid;

a tank having an opening including and an absorber chamber configured to hold the absorber within the absorber chamber;

a lid member joined to the opening of the tank and including an air communication port in communication with atmosphere;

a partition member arranged between the lid member and the absorber located inside the absorber chamber, the partition member being in contact with the absorber, wherein the lid member includes a first protrusion and a third protrusion to protrude toward the partition member, the third protrusion being formed to surround the air communication port, and the first protrusion being formed to surround the third protrusion and the air communication port, the partition member including a groove to be connected to the absorber chamber, a second protrusion to face the first protrusion, and a fourth protrusion to face the third protrusion;

a first communication path communicating with the air communication port formed between the first protrusion and the second protrusion; and a second communication path, other than the first communication path, formed between the third protrusion and the fourth protrusion, communicating with the air communication port, wherein, with the first protrusion and the second protrusion brought into contact with each other, a first protection wall to prevent an ink leakage is formed, and, with the third protrusion and the fourth protrusion brought into contact with each other, a second protection wall to prevent an ink leakage is formed.

* * * * *